INVENTOR.
R. A. Gurries

Oct. 7, 1958  R. A. GURRIES  2,854,768
FORWARD DUMP SCRAPER AND CONTROL MEANS THEREFOR
Filed March 4, 1957  5 Sheets-Sheet 2

INVENTOR.
R. A. Gurries
ATTYS

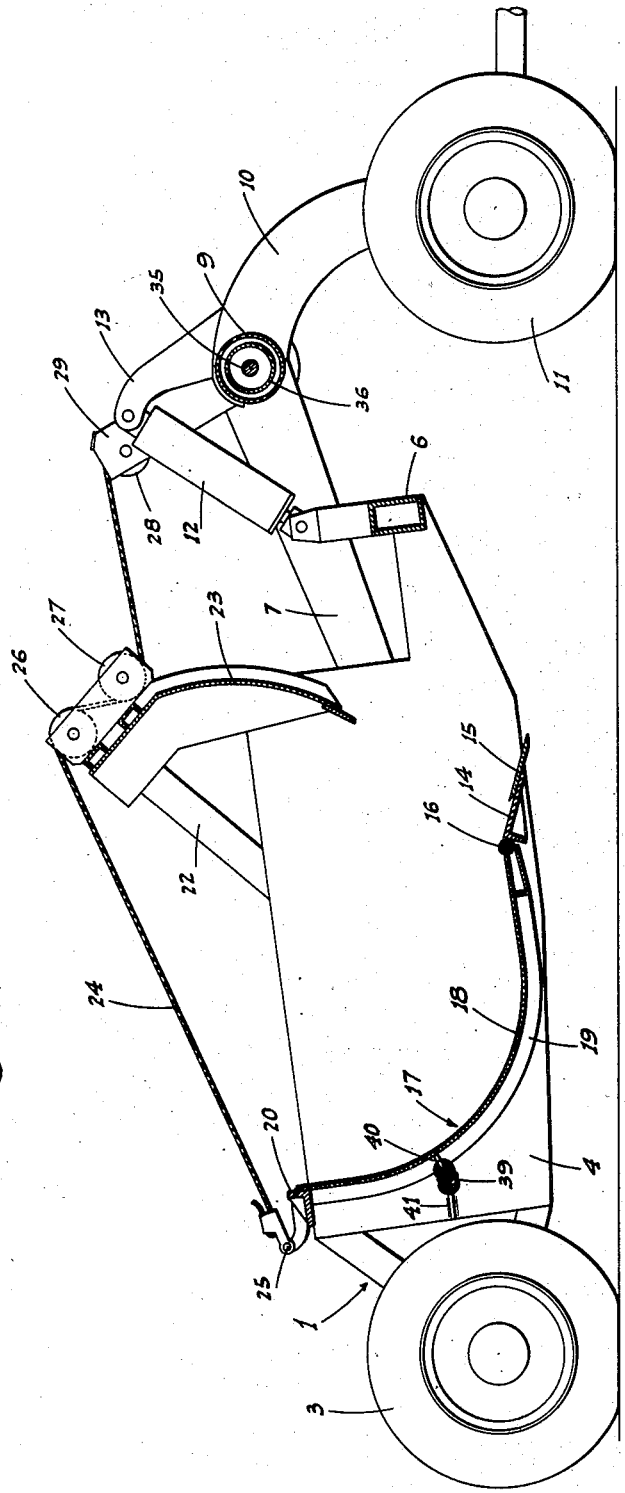

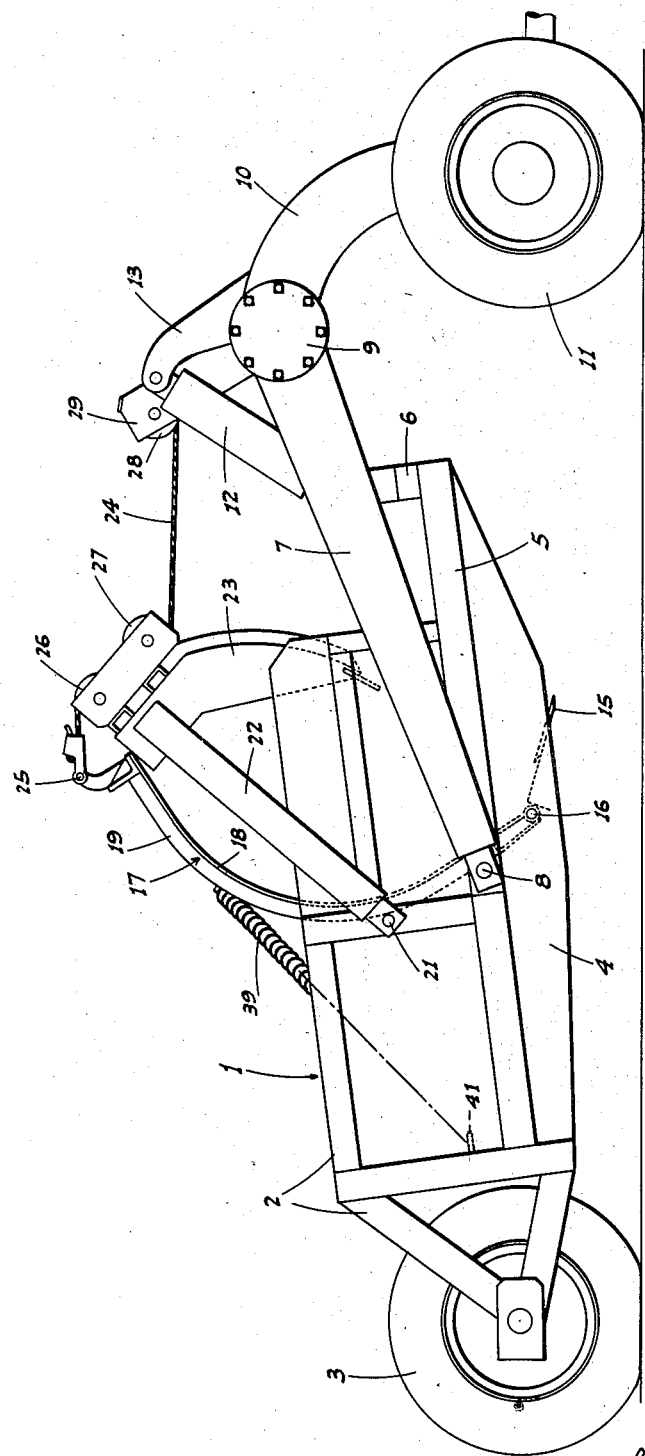

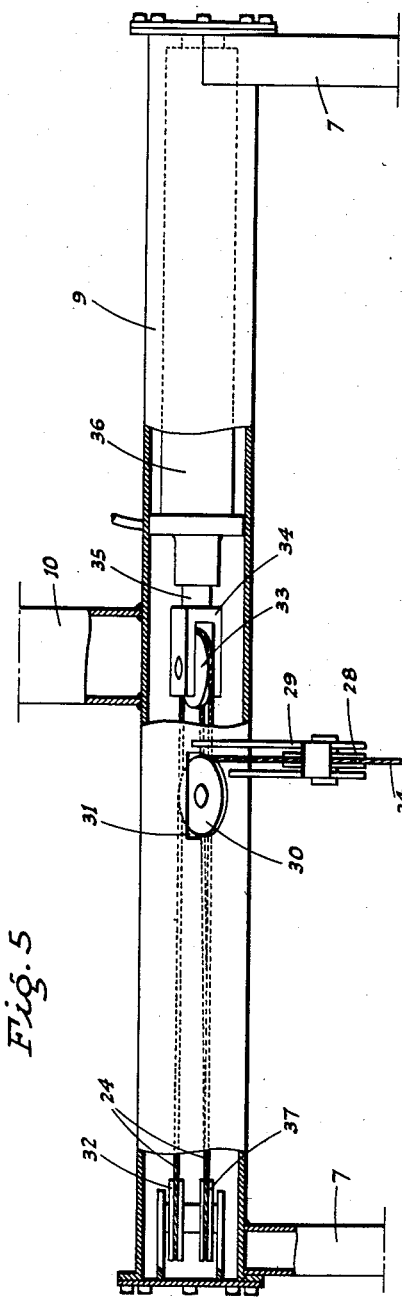
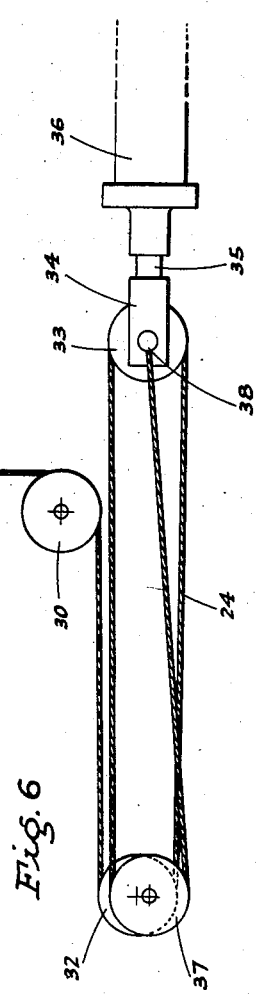
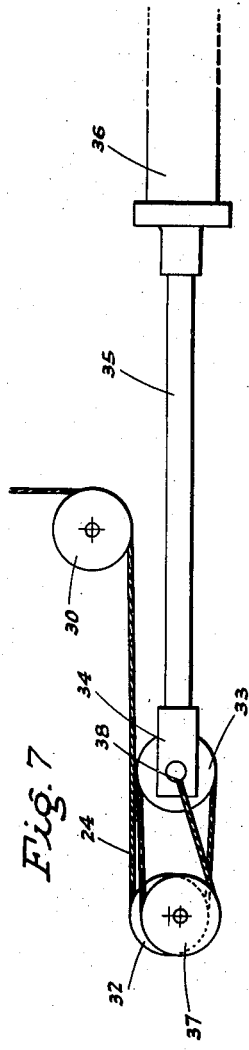

United States Patent Office 2,854,768
Patented Oct. 7, 1958

2,854,768

FORWARD DUMP SCRAPER AND CONTROL MEANS THEREFOR

Raymond A. Gurries, San Jose, Calif., assignor to Gurries Manufacturing Co., San Jose, Calif., a corporation of California Application March 4, 1957, Serial No. 643,696

4 Claims. (Cl. 37—126)

This invention relates to an earth working scraper of that type which includes a forwardly dumping bowl and an apron adapted to cooperate with the bowl in closing relation when the bowl is loaded, and to be raised from a closing position upon the bowl being dumped.

The principal object of this invention is to provide a control means for the apron and bowl in the form of a single cable arranged and connected thereto so that upon the cable being pulled, the apron will first be raised clear of the bowl when the latter is in a carrying position, and said bowl will then be swung to its dumping position while the apron is maintained, by said cable, in its raised position.

Another object of the invention is to provide a practical and reliable implement, and one which will be exceedingly effective for the purpose for which it is designed.

These objects are accomplished by means of such structure and relative arrangement of parts as will fully appear by a perusal of the following specification and claims.

In the drawings:

Fig. 3 is a similar view, showing the apron in its fully raised position.

Fig. 4 is a side elevation of the scraper showing the bowl in its dumped position.

Fig. 5 is a top plan view, partly in section, of the top cross beam of the mounting frame of the scraper, showing the reeving of the bowl and apron control cable and the actuating means for the cable in the position assumed when the bowl is tilted to dump.

Fig. 6 is a diagrammatic transverse elevation of the cable reeving and actuating means, in the same position as in Fig. 5.

Fig. 7 is a similar view, showing the cable and actuating means in the position assumed when the bowl and apron are in their lowered position.

Figure 1:
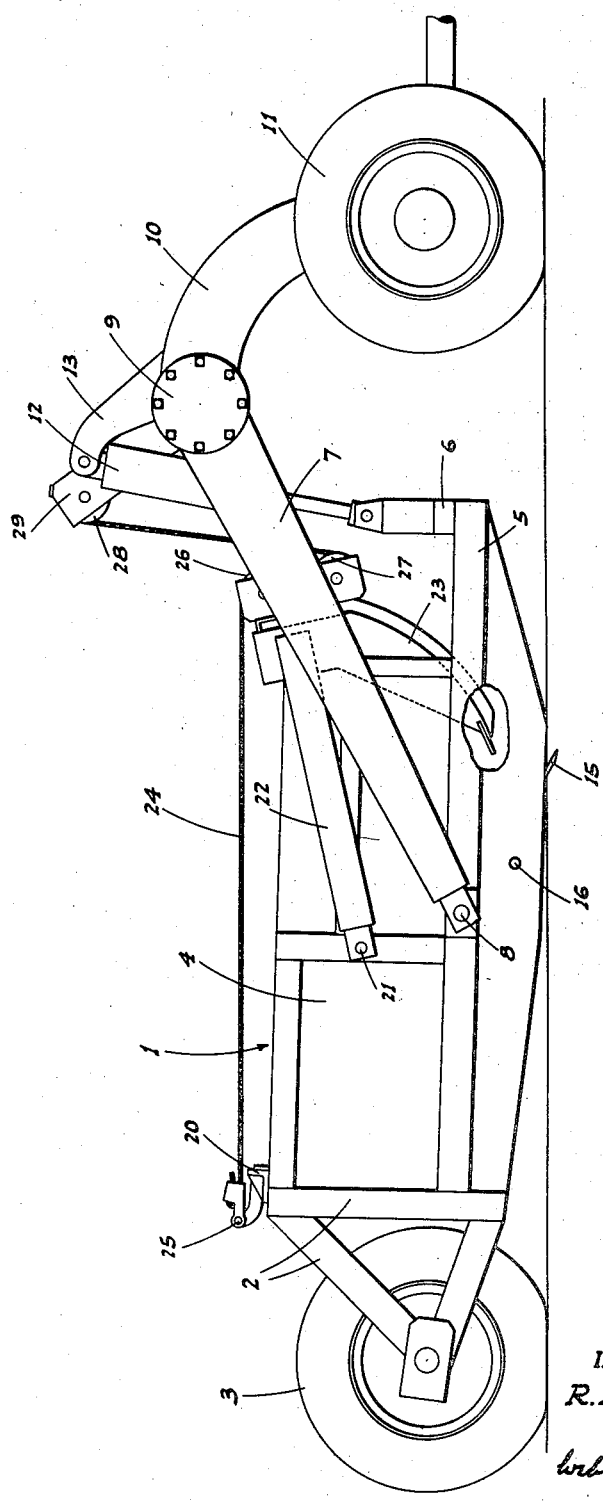
Fig. 1 is a side elevation of the scraper showing the same in its digging position, and with the apron raised somewhat to enable the scraper to load as it is advanced.

Referring now more particularly to the drawings, and to the characters of reference marked thereon, the scraper comprises an elongated frame structure, indicated generally at 1, which includes upstanding, transversely spaced side frames 2 supported at their rear end by wheels 3. Each frame 2 includes an inner solid wall-forming plate 4, and a longitudinal beam 5 extending forwardly some distance from the plate 4. At their forward end the beams 5 of the two frames 2 are connected by a rigid cross beam 6.

Side arms 7 extend forwardly and upwardly from frames 2 on the outside thereof, and are pivoted at their rear end on beams 5 intermediate their ends, as at 8. At their forward end, arms 7 are rigidly connected to a heavy tubular cross beam 9 from which a centrally disposed gooseneck 10 depends to a swivel connection with a steerable wheel truck 11 in a conventional manner.

A hydraulic cylinder unit 12 extends between, and is connected to, the cross beams 6 and to a bracket 13 rigid with and upstanding from beam 9. By this means the side frames 2 may be raised and lowered about the rear wheels 3 as an axis.

The plates 4 are connected at the bottom and intermediate their ends by a cross member 14 which supports a downwardly and forwardly sloping blade 15. Just rearwardly of member 14 a heavy cross pin 16 extends between plates 4, and forms the fulcrum for the bowl 17 of the scraper, and which consists essentially of a combination bottom and back plate 18 stiffened by longitudinal transversely spaced ribs 19 and by a rear upper end cross bar 20 which normally rests on the top of frames 2 adjacent the rear end thereof.

Figure 2:
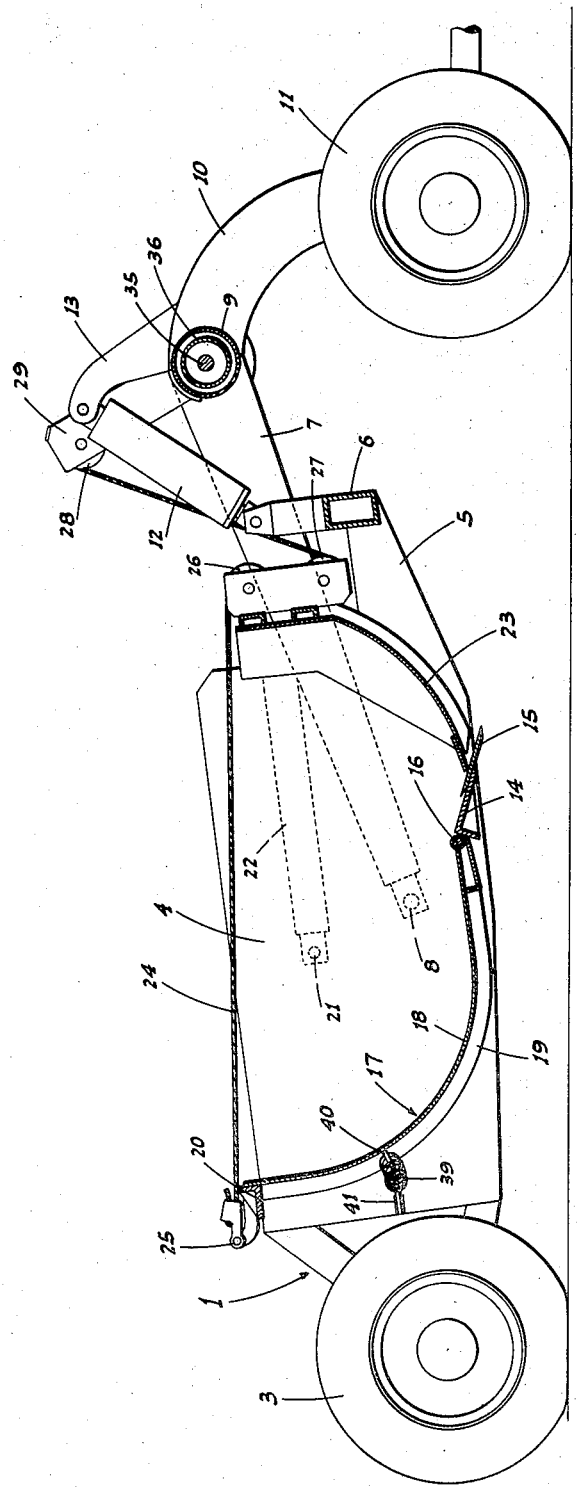
Fig. 2 is a sectional elevation of the scraper showing the bowl as raised to a closing position with the apron, and in a load carrying position.

Pivoted at their rear end on the frames 2 intermediate their ends and above pivots 8, as at 21, are forwardly projecting arms 22 which—at their forward end, ahead of plates 4—are rigidly connected to and support a depending apron 23 arranged at its lower end to cooperate with the blade 15 in closing relation when the frames 2, and the bowl, are raised to a load carrying position, as shown in Fig. 2.

When the apron is raised from such position, the load may be dumped from the bowl upon the latter being tilted forwardly, as will be evident, and it is the means which controls the movements of the apron and bowl in coordinated relation that is the major feature of this invention, and such means will now be described.

A pull cable 24 is swivelly anchored at its rear end, as at 25, on the cross bar 20 at a point centrally of its width. From this anchor, the cable extends forwardly and over a sheave 26 mounted on the back of the apron adjacent the top thereof. The cable then passes about and under another sheave 27 below sheave 26 and also mounted on the apron. From sheave 27 the cable extends forwardly to and over a sheave 28 mounted in a bracket 29 upstanding from the cross beam 9. From sheave 28 the cable passes about an upstanding direction-changing sheave 30 mounted in connection with the bracket 29 and beam 9 and extending into the latter through an opening 31 in the latter (see Fig. 5).

From sheave 30 the cable extends transversely of the beam 9 to and about a sheave 32 mounted in the beam at one end thereof. From sheave 32 the cable extends along beam 29 toward the other end thereof and passes about a sheave 33 mounted in a clevis 34 fixed on the piston rod 35 of a hydraulic cylinder 36 fixed in the beam 9 at the other end thereof, and of course projecting toward said one end of the beam. From sheave 33 the cable extends to and about a sheave 37 mounted in the beam 9 alongside sheave 32, and extends thence to an anchor point 38 on the clevis 34.

The above described control structure is arranged so that when the bowl 17 is in its lowermost position in the frame 1 (either digging or carrying), and the apron is in its lowest position, the piston rod 35 is extended as far as possible, as shown in Fig. 7, and the cable has been payed out from the sheaving within the beam 9 to its limit.

This paying-out arrangement is such that when the apron is in its lowermost position its lower edge will be some distance above the blade 15 when the scraper is lowered to the scraping position shown in Fig. 1. At this time the piston rod 35 is fully advanced from cylinder 36; thus automatically preventing any further paying out of the cable and downward movement of the apron. However, when the bowl is lifted to the load carrying position, by suitable manipulation of cylinder unit 12, the apron is lifted sufficiently to have a good closing action with blade 15, as shown in Fig. 2.

When the apron is in this position it will be seen that the lower apron-mounted sheave 27, and under which the cable 24 passes, is considerably below and somewhat rearwardly of the sheave 28 which is mounted on beam 9, and about which sheave the cable passes from the sheave 27 to the pull means within said beam.

A pull on the cable will thus cause the apron to be lifted without imparting any lift to the bowl 17, since the weight of the loaded bowl is of course far in excess of that of the apron and its relatively small load. This pull on the cable is imparted thereto by feeding hydraulic fluid into the cylinder 36 at that end thereof which will cause the piston rod 35 to be retracted into the cylinder, and thus increasing the length of the cable runs within the beam, and a corresponding shortening of the cable outside the beam.

When the apron has been lifted to a desired height such as to provide good clearance from blade 15, the apron and sheaves 26 and 27 have shifted to the rear somewhat, and the portion of the cable 24 which extends between the sheaves 27 and 29 is substantially horizontal, as shown in Fig. 3.

Any further pull on the cable will therefore be imparted to the bowl 17, swinging the same upwardly and forwardly about the cross pin 16 as an axis to a full dumping position, as shown in Fig. 4. During this movement of the bowl the apron remains in its upwardly lifted position, and when the bowl has reached its full dumping position the piston rod 35 is fully retracted in cylinder 36, as shown in Fig. 6, and automatically limits further forward movement of the cable rearwardly of sheave 28.

When the fluid is relieved from the cylinder 36 the bowl and apron will drop of their own weight to their initial position; the piston rod 35 being likewise returned to an advanced position by cable action within the beam 9.

In order to aid this downward movement of the bowl a pair of helical compression springs 39 is provided between a central lug 40 on the back of the bowl and anchor points 41 on the side frames 2 at the rear end thereof. These springs extend diagonally in opposite directions from lug 40 so that when the bowl is fully lowered the springs are entirely slack and lie in a transverse and horizontal position, as shown for instance in Fig. 3.

It will therefore be seen that the operator, to cause the proper and sequential movement of the bowl and apron, need only admit fluid to the cylinder and subsequently relieve such fluid, with the assurance that the apron and bowl will move up and then down, and with such movements will automatically assume the desired positions without any further attention on the part of the operator being necessary.

From the foregoing description it will be readily seen that there has been produced such an implement as will substantially fulfill the objects of the invention, as set forth herein.

While this specification sets forth in detail the present and preferred construction of the implement, still in practice such deviations therefrom may be resorted to as do not form a departure from the spirit of the invention, as defined by the appended claims.

Having thus described the invention the following is claimed as new and useful, and upon which Letters Patent are desired:

1. In a scraper having a frame structure, a bowl member mounted therein for upward and forward swinging movement to a dumping position from a load receiving position in the frame structure, and a pull cable anchored at its rear end on and projecting forwardly from the bowl member, the frame structure including a tubular cross beam ahead of the bowl member; a direction-changing sheave on the beam guiding the cable from the bowl member into the beam at a point intermediate its ends, and control means for the cable comprising a hydraulic cylinder secured within and extending lengthwise of the beam, a piston rod projecting from the cylinder, the cable at its forward end being anchored on the rod, and a guide sheave arrangement connected to the beam and rod and about which the cable is reeved and leading the cable from the piston rod to the direction-changing sheave; said arrangement being disposed so that movement of the piston rod in one direction will impart a pull to the cable.

2. In a scraper having a frame structure, a bowl member mounted therein for upward and forward swinging movement to a dumping position from a load receiving position in the frame structure, and a pull cable anchored at its rear end on and projecting forwardly from the bowl member, the frame structure including a tubular cross beam ahead of the bowl member; a direction-changing sheave on the beam guiding the cable from the bowl member into the beam at a point intermediate its ends, and control means for the cable comprising a hydraulic cylinder secured within and extending lengthwise of the beam from adjacent one end thereof, a piston rod projecting from the cylinder toward the other end thereof, said direction-changing sheave directing the cable toward said other end of the beam, a first sheave fixed in the beam at said other end thereof and over which the cable passes from the direction-changing sheave, a second sheave mounted on the piston rod and about which the cable passes from the first sheave, a third sheave mounted in the beam alongside the first sheave and about which the cable passes from the second sheave, and an anchor point on the rod to which the cable extends from the third sheave; the piston rod being fully extended when the bowl member is in its lowest position in the frame structure.

3. In a scraper which includes a frame structure having side plates, a transverse blade mounted between the plates, a cross pin mounted adjacent and rearwardly of the blade, a bowl member pivoted on the pin and normally extending rearwardly and then upwardly therefrom for forward and upward swinging movement from a load carrying to a dumping position, and an apron pivoted on the frame structure for swinging movement between a closing position with the blade and an upper position clear of the blade; a pull cable anchored at its rear end on the bowl member at the top thereof and extending thence forwardly, means to apply a pull to the cable from a point ahead of the apron, upper and lower sheaves mounted on the front of the apron, the cable passing from the anchor forwardly over the upper sheave and then to and under the lower sheave, and another sheave mounted on the frame structure above said lower sheave when the apron is in a blade engaging position and over which the cable after leaving the lower sheave passes before reaching the pull means.

4. A structure, as in claim 3, in which the cable extends substantially horizontally between the anchor and the upper sheave when the bowl is in a load receiving position and the apron is engaged with the blade whereby when the apron is raised said cable will then extend at a downward slope to the anchor.

References Cited in the file of this patent

UNITED STATES PATENTS

| | | |
|---|---|---|
| 2,152,899 | Maloon | Apr. 4, 1939 |
| 2,306,892 | McGlade | Dec. 29, 1942 |
| 2,650,440 | Quartullo | Sept. 1, 1953 |
| 2,662,312 | Kadz | Dec. 15, 1953 |

FOREIGN PATENTS

| | | |
|---|---|---|
| 202,385 | Australia | July 5, 1956 |